United States Patent [19]

Bedrossian

[11] Patent Number: 5,311,507
[45] Date of Patent: May 10, 1994

[54] AUTOMATED INTERACTIVE MASS COMMUNICATIONS SYSTEM

[75] Inventor: Bedros A. Bedrossian, New York, N.Y.

[73] Assignee: Interactive Telephonics, Inc., New York, N.Y.

[21] Appl. No.: 942,325

[22] Filed: Sep. 9, 1992

Related U.S. Application Data

[63] Continuation of Ser. No. 933,854, Nov. 24, 1986, abandoned.

[51] Int. Cl.$^5$ .................................................. H04M 11/00
[52] U.S. Cl. .................................... 370/58.2; 379/92; 379/204; 379/101
[58] Field of Search .................. 370/58, 66, 110.3, 62, 370/58.2; 379/69, 97, 92, 216, 207, 88, 89, 92, 101, 204; 358/402, 84, 86, 407; 455/2, 4, 5

[56] References Cited

U.S. PATENT DOCUMENTS

| | | | |
|---|---|---|---|
| 3,614,328 | 10/1971 | McNaughton | 370/62 |
| 3,803,491 | 4/1974 | Osborn | 455/5 |
| 4,001,508 | 1/1977 | Johnson | 379/69 |
| 4,228,424 | 10/1980 | LeNay et al. | 379/92 |
| 4,397,030 | 8/1983 | Becker et al. | 370/24 |
| 4,541,087 | 9/1985 | Comstock | 370/62 |
| 4,558,444 | 10/1985 | Kennedy et al. | 370/58 |
| 4,649,563 | 3/1987 | Riskin | 379/97 |
| 4,689,619 | 8/1987 | O'Brien, Jr. | 358/84 |
| 4,829,558 | 5/1989 | Welsh | 379/92 |
| 4,922,520 | 5/1990 | Bernard et al. | 379/88 |

FOREIGN PATENT DOCUMENTS

| | | |
|---|---|---|
| 0103438 | 3/1984 | European Pat. Off. . |
| 0046380 | 4/1981 | Japan ..................... 379/92 |

Primary Examiner—Edward L. Coles, Sr.
Assistant Examiner—Jill Jackson
Attorney, Agent, or Firm—Darby & Darby

[57] ABSTRACT

A real time automated interactive mass communications system provides communications between a central communications processor and groups of subscribers. Typically, each group is associated with a central office. A set of local communication processors are provided, each being in two-way communication with the central processor and each being linked to one of the central offices and being preferably on site. Each local communication processor includes a processor unit, an audio controller and a set of multi-line controllers. The audio controller takes audio messages received from the central processor and generates a train or delayed set of the messages which are supplied to each of the multi-line controllers. Each multi-line controller services a set of lines connected to the central office switch, receives telephone number data from the central communication processor, and calls the list of telephone numbers to which it has been assigned. Upon detecting a subscriber response, the multi-line controller selects the next occurring message in the message train for transmission to the subscriber. Subscriber responses in the form of key depressions are detected in the multi-line controllers and are used to supply data relating to the subscriber response to the central communications processor.

18 Claims, 5 Drawing Sheets

AUTOMATED INTERACTIVE MASS COMMUNICATIONS SYSTEM

This is a continuation of co-pending application Ser. No. 06/933,854, filed on Nov. 24, 1986, now abandoned.

BACKGROUND OF THE INVENTION

1. Field Of The Invention

This invention relates to communications networks, and more particularly, to an automated interactive communications network for establishing simultaneous two-way communications between a central site and a large number of dispersed sites such as those of telephone subscribers.

2. Description Of The Prior Art

In many situations, such as polling, merchandising, warning systems, and remote reading of utility consumption, it is desireable to transmit telephone messages to a large number of telephone subscribers. Frequently, a single operator's console is provided to allow calls to be made. A separate link from the telephone subscriber to the central console is established, and a pre-recorded message is transmitted to the subscriber. Some systems provide only one-way communication between the operator and the telephone subscriber while others record responses for later analysis or processing. Typical systems access a group of subscribers in a sequential manner.

Telephone messaging systems are known that selectively and simultaneously transmit stored messages to telephone callers and have provisions for storing and distributing called-in messages. While some of these systems can simultaneously service numbers of callers, prerecorded or stored messages as opposed to real time responses, are provided.

Techniques including hardware and methodology are also available for the sequential transmission of telephonic messages between a central caller and a group of subscriber's. To do this on a large scale, that is, to communicate with thousands of possibly widely dispersed subscribers, would be so costly using conventional techniques as to be economically unattractive.

In addition, current systems lack the capability of compiling the results of the subscribers' responses in a practically instantaneous manner.

OBJECTS AND SUMMARY OF THE INVENTION

It is therefore an object of the present invention to overcome these shortcomings of the prior art by providing cost effective real time mass communication.

Other objects of the present invention are:

(1) to provide a communications network to establish two-way communication between a number of local subscribers and a central unit;

(2) to provide a communications network that permits simultaneous dialing of a large number of telephone subscribers from a central unit;

(3) to minimize the costs of calling a large number of telephone subscribers;

(4) to permit telephone messages to be transmitted simultaneously to a large number of telephone subscribers; and p1 (5) to provide virtually instantaneous results to subscribers' real time responses.

In accord with the present invention, a communications network for establishing two-way communications with a number of local subscribers includes (1) a central communications processor, (a) for identifying local subscribers with whom two-way communication is to be established, (b) for initiating communications and, in some cases, (c) for processing real time responses; (2) a plurality of local communications processors, each of the local communications processors establishing two-way communication with groups of local subscribers, and (3) means for providing two-way communication between the central communications processor and the local communications processors.

Other objects, features and advantages of the present invention will be apparent from the following detailed description taken in conjunction with the accompanying drawings.

DETAILED DESCRIPTION OF THE PREFERRED EMBODIMENT

Figure 1:
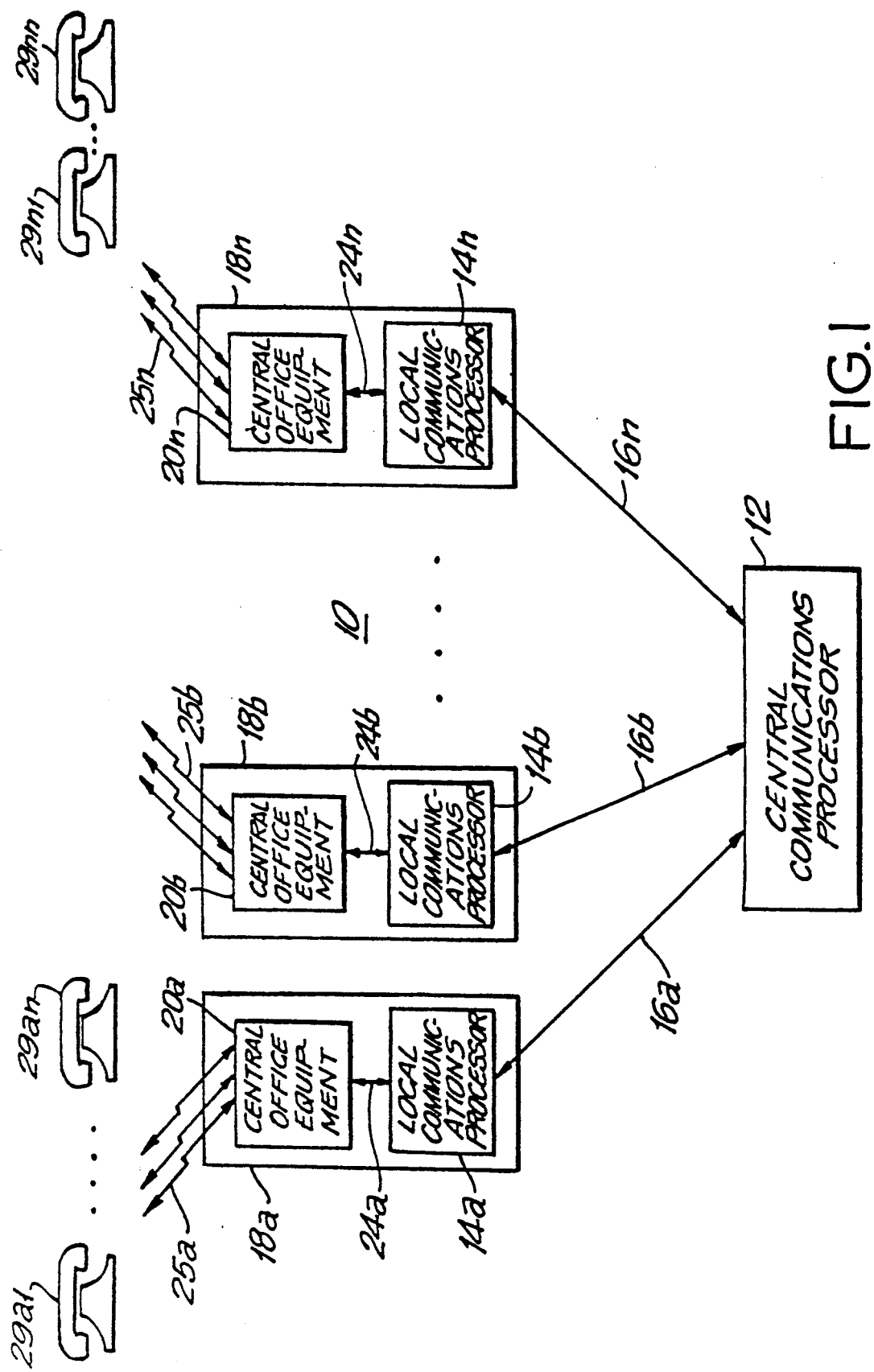
FIG. 1 is a schematic block diagram of an embodiment of a mass communications system in accord with the present invention.

Referring to the drawings, and initially to FIG. 1 thereof, a communications network 10 for establishing two-way communications with a number of local subscribers includes a central communications processor 12 and a number of local communications processors 14a, 14b, ..., 14n. In the illustrated embodiment, these n local communications processors are coupled to the central communications processor 12 via respective telephone links 16a, 16b, ..., 16n. In the preferred embodiment, the links comprise one or two two-way telephone communications connections between each local communications processor 14a, ..., 14n and the central communications processor 12 (the second line being a backup in case of failure of the first).

Each local communications processor 14a, ..., 14n is typically located in a central office 18a, 18b, ..., 18n and each is coupled to the central office equipment 20a, 20b, ..., 20n, respectively, by groups of telephone lines 24a, 24b, ..., 24n. Groups of lines 25a, 25b, ..., 25n connect the central office equipment 20a, ..., 20n (typically electronic switching systems) to local telephone subscribers 29a1, ..., 29an, ..., 29n1, ..., 29nn.

In many applications, the central communications processor 12 will be remotely located from the local communications processors 14a, ..., 14n, which themselves will be dispersed among distant central offices 18a, ..., 18n. Thus only the long distance telephone lines 16a, ..., 16n are required to transmit messages from central communications processor 12 to local subscribers via communications network 10. Telephone lines 25a, ..., 25n, on the other hand, can be local lines. This approach of using only a few long distance lines but a large number of local lines, significantly reduces the cost of simultaneously communicating with a large number of dispersed, remote subscribers.

Even in the case where telephone lines 16a, ..., 16n are local lines, significant cost savings can be effected because the telephone lines 24a, ..., 24n between local communications processors 14a, ..., 14n and the respective central office equipment 20a, ..., 20n are directly connected to that equipment.

Figure 2:
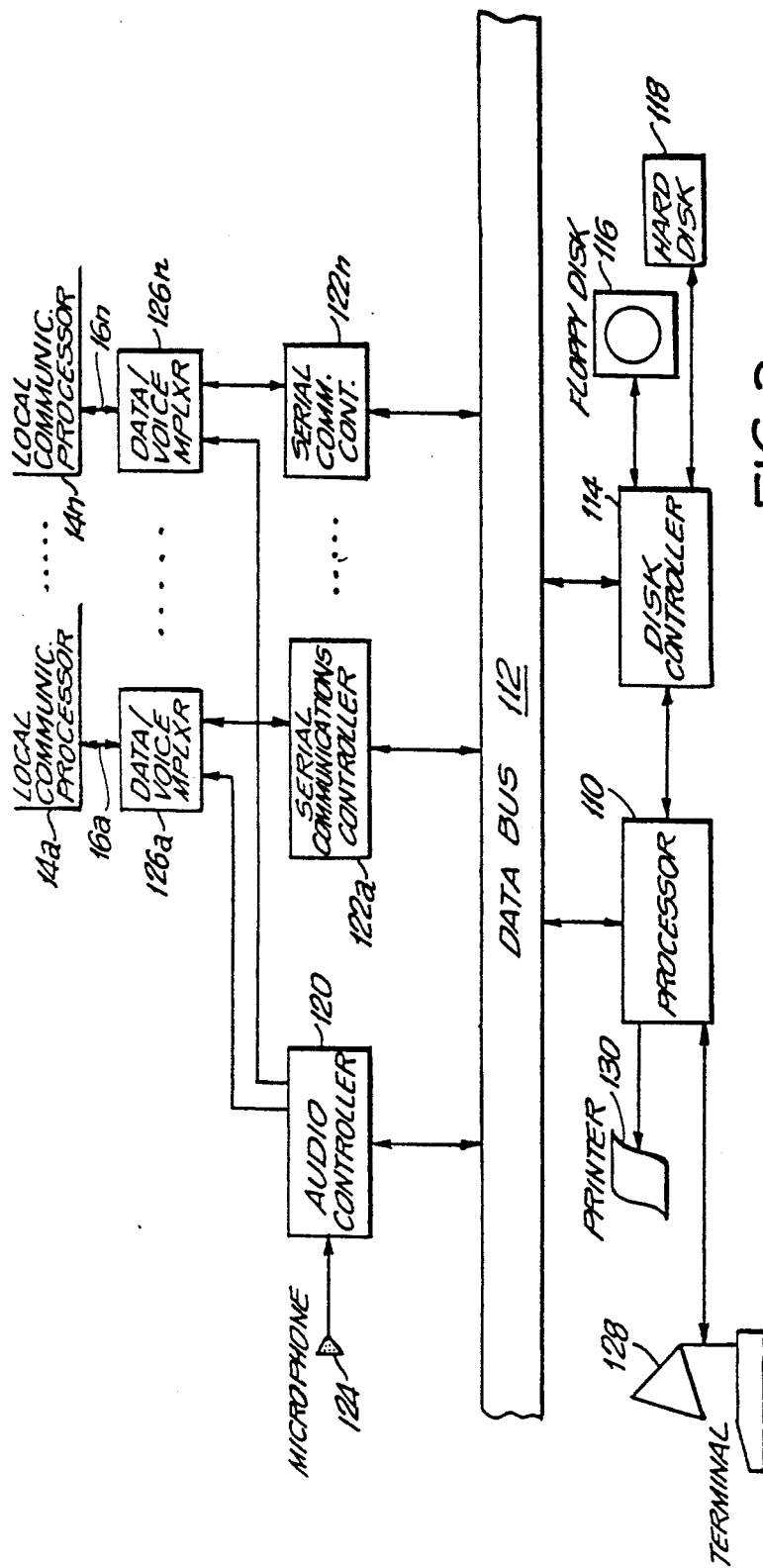
FIG. 2 is a schematic block diagram of the central communications processor employed in the embodiment of FIG. 1.

Further details of the central communications processor 12 are illustrated in FIG. 2. The unit includes a processor 110 embodying a suitably programmed microprocessor which is coupled through a data bus 112 to a disk controller 114, a terminal 128 and a printer 130. In response to processor 110, disk controller 114 controls the flow of data between the system and storage such as a floppy disk 116 and a hard disk 118.

Processor 110 is also coupled through data bus 112 to an audio controller 120, and a set of serial communications processors 122a, ..., 122n. The latter convert parallel data from databus 112 to serial form for transmission via the multiplexers 126a, ..., 126n.

Audio communications, such as voice communication, can be supplied, e.g., via microphone 124, to audio controller 120. This audio message can be transmitted in an analog form via data/voice multiplexing/demultiplexing units 126a, ..., 126n and lines 16a, ... 16n, to the local communications processors 14a, ... 14n, or can be digitized and stored on floppy disk 116 or hard disk 118 via data bus 112 for subsequent transmission.

The digitally stored message can be recalled for transmission to the local communications processors 14a ... 14n, in two different ways. In one, the digitized data is supplied through data bus 112 to the audio controller 120 for D to A conversion. The analog signal is then transmitted through the data/voice multiplexing-/demultiplexing units 126a, ... 126n to the local communications processors 14a, ... 14n. Alternatively, the digitized message can be supplied through data bus 112 and the serial communications controllers 122a, ..., 122n to the data/voice multiplexing/demultiplexing units 126a, ..., 126n for transmission in digital form to the local communications processors 14a, ... 14n.

In the illustrated embodiment, units 126a, ..., 126n multiplex and demultiplex voice and data communications (including control and status signals) from audio controller 120 and the serial communications controllers 122a, ..., 122n. In an alternate embodiment (FIG. 2A), the data/voice multiplexing/demultiplexing units can be eliminated, and replaced with standard modems, e.g. 126Ma, and separate voice lines, e.g. TLa, connected between the audio controller 120 and each of the local communication processors.

Figures 3, 3A:
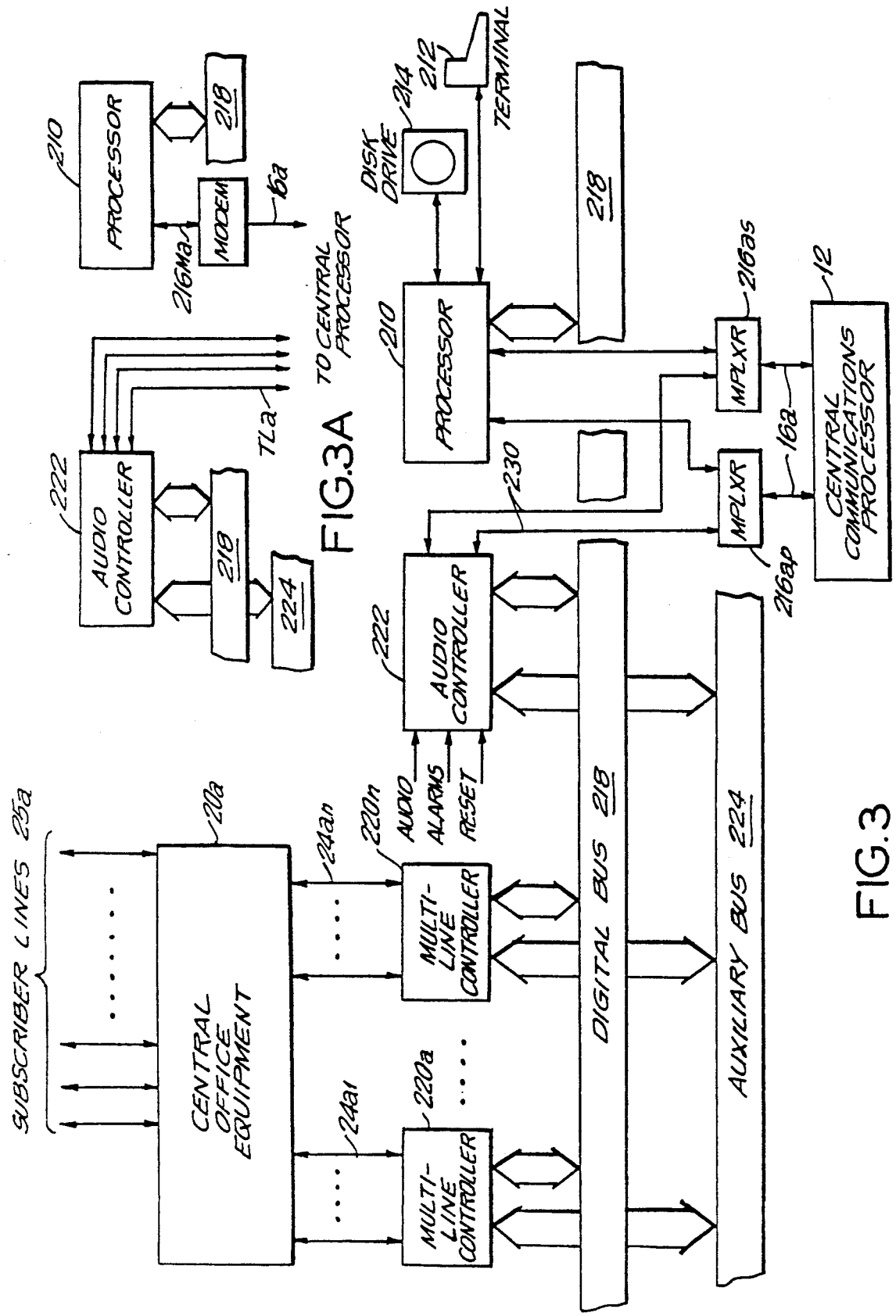
FIG. 3 is a schematic block diagram of the local communications processor of the embodiment of FIG. 1.
FIG. 3A schematically illustrates modifications to the local processor to adapt it to the modifications of FIG. 2A.

Further details of the local communications processors are illustrated in FIG. 3. As shown, each unit includes a processor 210 which incorporates a suitably programmed microprocessor and optionally coupled thereto, a disk drive 214 and terminal 212. Processor 210 communicates via data/voice multiplexing units 216ap and 216as and a line, e.g. 16a, with the central communications processor 12, being connected to an associated multiplexing unit, e.g. 126a (FIG. 2). Digital data transmitted from the central processor through multiplexing units 216ap and 216as are supplied to processor 210 for writing to disk 214 for storage, if necessary, or for executing commands sent from the central communications processor.

Processor 210 is also coupled over digital data bus 218 to multi-line controllers 220a, ..., 220n, and audio controller 222. An auxiliary bus 224 also links the audio controller 222 and the multi-line controllers.

Voice communications from central communications processor 12 are supplied via multiplexing units 216ap, 216as to audio controller 222, and thence, to multi-line controllers 220a, ..., 220n via auxiliary bus 224. Subscribers responding to calls by the multi-line controllers (MLC) then receive the messages which pass from the MLCs through the central office equipment 20a.

In the preferred embodiment, this is the path for analog voice communications and (in reverse) for receipt of responses keyed by the subscribers. Also in the preferred embodiment. The recorded message from the central communications processor 12 is delayed in audio controller 222, in a number of steps S, by S equal amounts, so that auxiliary bus 224 contains S versions of the same message, with each version slightly delayed from the preceding version. In the illustrated embodiment, the number of steps S = 8.

Multi-line controllers 220a, ..., 220n select the appropriately delayed message from auxiliary bus 224 in response to subscribers answering their telephones, thus allowing them to hear the message from its beginning.

Telephone line groups 24al, ... 24an connect the multi-line controllers 220a, ..., 220n, to the central office equipment, e.g. 20a, which routes the communications to the selected subscriber lines, e.g. 25a. By way of example, each local communications processor has sixteen outgoing telephone lines connected to each of its multi-line controllers.

Figure 2A:
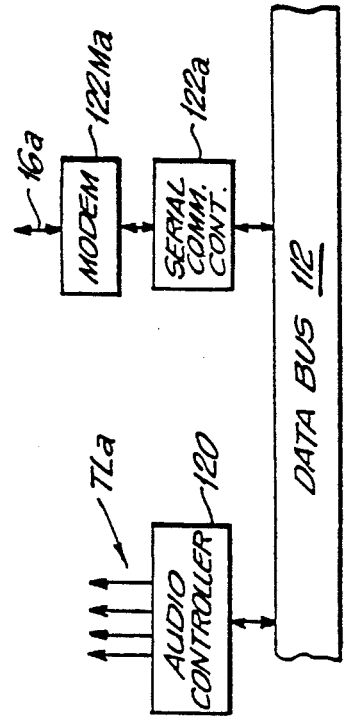
FIG. 2A schematically illustrates certain alternative configurations of the central processor.

With respect to the communication link between each local processor and the central processor 12, it may be recalled that an alternate configuration was described and illustrated in FIG. 2A. The counterpart modifications to the local processors are shown in FIG. 3A.

As illustrated therein, audio controller 222 is connected to the previously described telephone lines, e.g. TLa, FIG. 2A, 3A, thereby being linked with the central processor audio controller 120. Similarly, the processor 210 connects to the digital/voice lines, e.g. 16a, via a modem 216Ma thus making a connection with the modem 126Ma, FIG. 2A, of the central processor.

Figure 4:
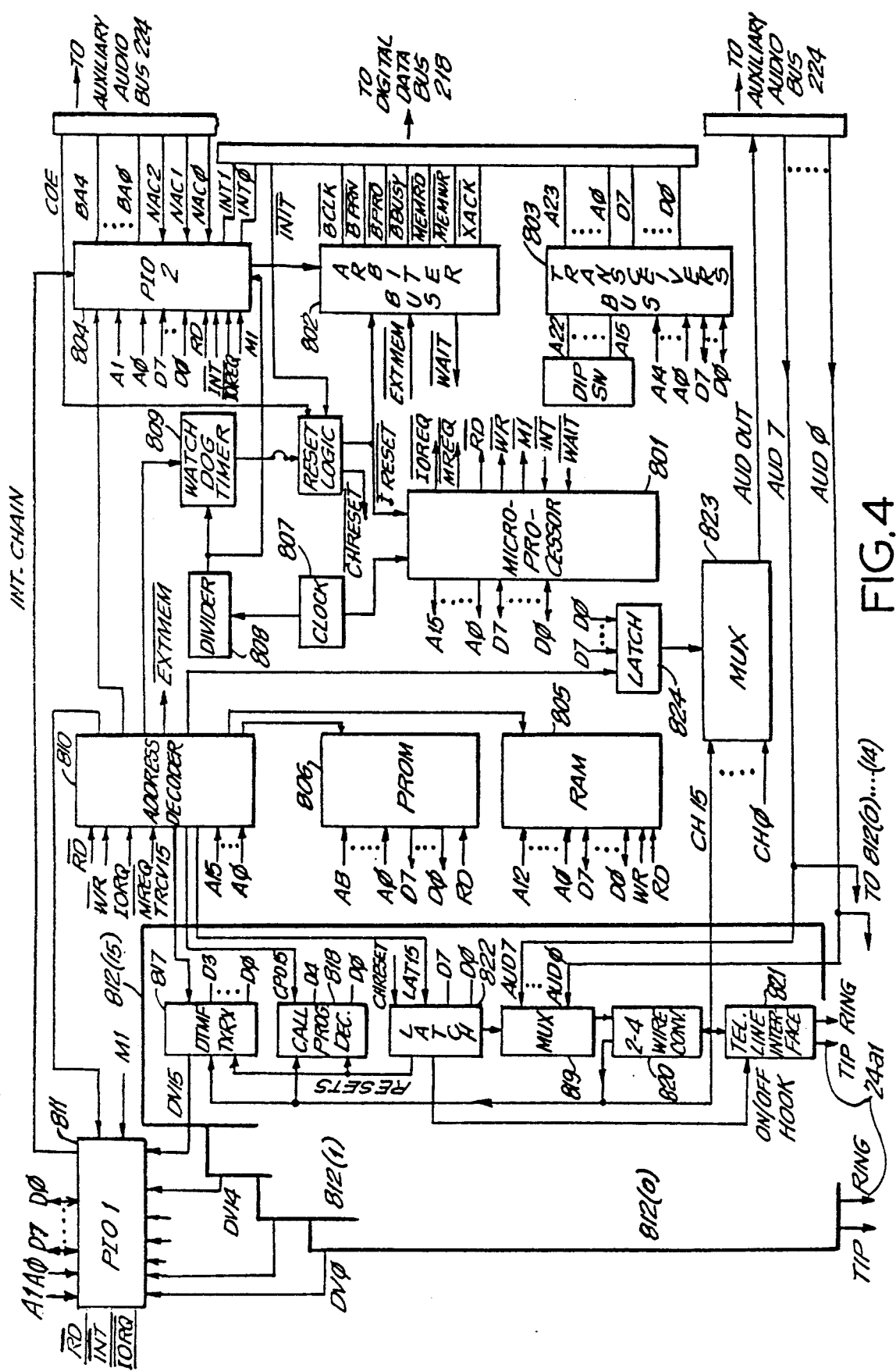
FIG. 4 is a schematic block diagram of the multi-line controller in the local communications processor of FIG. 3.

Further details of each multiline controller 220a, ... 220n are illustrated in FIG. 4. The illustrated MLC is a particular implementation built around an 8 bit microprocessor 801 where each MLC handles a group of 16 telephone lines, e.g. 24al, connected to the central office equipment and where the digital data bus 218 is implemented with Intel Corporation's Multibus ®. (Multibus is a trademark of Intel Corporation).

The microprocessor is typically configured to include RAM 805, programmable ROM (PROM) 806 and timing circuits including clock 807 and counter/timing units 808 and 809. These components communicate with the microprocessor and each other via internal data bus, (D0, D1 ... D7), address bus (A0, A1 ... A15) and a typical set of microprocessor control lines including read and write enable $\overline{RD}$ and $\overline{WR}$; interrupt and wait, $\overline{INT}$, $\overline{WAIT}$; input/output request $\overline{IORQ}$, etc.

The microprocessor 801 communicates with the processor 210 of FIG. 3 through the bus arbiter 802 and bus transceivers 803 which connect to the digital data bus 218. The microprocessor communicates with the audio controller 222 of FIG. 3 via the auxiliary (audio) bus 224 through parallel input/output controller #2, 804 (PIO2). The 3 bit input, NAC0, NAC1, NAC2, identifies to microprocessor 801 the next available channel, i.e. the message in the train of delayed messages, which is about to begin.

The microprocessor assigns a telephone number to be called to each of the control electronics units 812(0), 812(1), ..., 812(15). It communicates with these units through the internal data bus D0, D1 ... D7, an address decoder 810, and a parallel input/output controller 811, (PIO-1). The latter interfaces with the telephone line equipment 812(0), ... 812(15) via lines DV(0), ..., DV(15).

The address decoder is connected to the microprocessor via the address bus and various of the control signal lines. Through its connection to other elements of the system, it determines which units the processor addresses.

Each of the telephone line control electronics units 812(0), ..., 812(15) consists of a DTMF transceiver 817, call progress decoder 818, an audio multiplexer 819, a 2-to-4 wire converter 820, a telephone line interface 821 and a latch 822 for implementing the reset and on/off hook functions. DTMF 817 receives the number to be dialed or indicates what keys the subscriber depressed in response to a message. Outgoing tip and ring lines 24al connect to the central office equipment. Communications to these lines from the local Audio Controller is via the auxiliary bus 224, the AUD0, ... AUD7 lines, the MUX 819 in each unit, the converter 820 and the interface 821.

The audio bus also supplies to the microprocessor 801 via PIO 804 (PIO-2) the NAC signals, (described below in connection with the audio controller), as well as board address signals BA0, ..., BA4, and a central office enable signal (COE). The latter permits the central office to shut down the processor if traffic or other conditions warrant such action.

Telephone number data appearing on the digital data bus 218 are, under control of microprocessor 801, first stored in RAM 805 and then read out and used to control the digit tone dialing provided by the DTMF transceiver 817. The selected digit is determined by the state of the internal data bus lines D0, D1, D2 and D3 connected to the transceiver.

Audio, in the form of the set of spaced audio messages A0, A1, ..., A7, is supplied to each MUX 819 via audio bus 224. Microprocessor 801 decodes the NAC inputs to PIO2 to identify the next available audio message of the set of delayed messages. Thus, when the call progress decoder 818 of a particular interface unit 812 (N) indicates a subscriber is ready for reception, microprocessor 801 via MUX 819 connects the next available message to the subscriber.

When a subscriber depresses one of the keys on his key pad, the tones associated with that key are detected by the DTMF transceiver 817 and placed on the transceiver data lines D0, ..., D3. The DTMF unit also signals PIO1 via its respective data valid line, e.g. DV15, that a key depression has been detected.

An interruption is consequently generated causing the microprocessor to read and store the value of the depressed key, thus providing the system with the subscriber's response.

A multiplexer 823, controlled by a latch 824, multiplexes the audio channel signals, CH0 AUD, CH1 AUD, ... CH15 AUD from the electronics units 812(0), ..., 812(n), and supplies the selected output to the audio auxiliary bus 224 to permit monitoring the voice responses of a selected channel.

Figure 5:
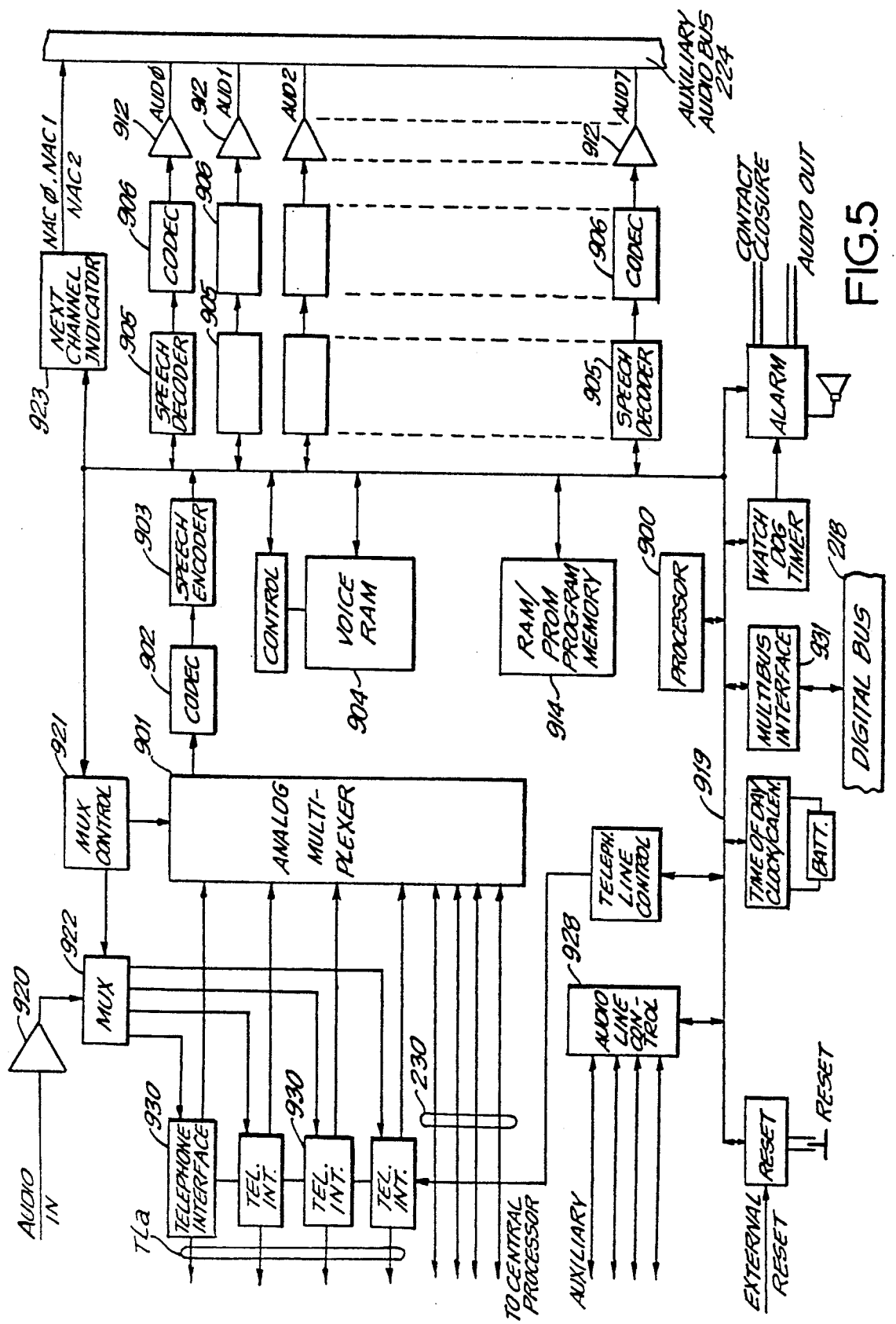
FIG. 5 is a schematic block diagram of the audio controller section of the local communications processor of FIG. 3.

Further details of the audio controller section of each local communication processor are illustrated in FIG. 5. The illustrated controller is implemented around an 8 bit microprocessor 900. Processor 900 communicates with the processor 210 of FIG. 3 via the Multibus bus system through the interface 931.

The microprocessor 900 also communicates with the multiline controllers 220a, ..., 220n of FIG. 3, through the auxiliary bus via the next channel indicator 923.

Communication with the auxiliary bus 224 of the local processor is via 8 audio channels, AUD0, AUD1, ... AUD7. The link to the subscriber side of the system is via the lines 230 which connect to the local processor multiplexer, e.g. 216ap or 216as (see FIG. 3)(which is linked in turn to the central communications processor 12). The lines 230 on the internal side connect to the analog multiplexer 901.

Alternatively, the link to the subscriber side may be by way of telephone interface units 930 which interface the incoming lines TLa of the modified configuration (see FIG. 3A) to the analog multiplexer 901.

The analog multiplexer 901 selects the source of the incoming analog message from either the lines 230 or TLa. The audio is then digitized by the coded stage 902 and compressed by the speech encoder 903. The digital data is then stored by the microprocessor in the voice RAM 904. When required, the microprocessor can send the digital data from the voice RAM to the speech decoders 905 in successively delayed segments, where the data is expanded and passed on to the codes 906 which recreate the original audio message. Thus, 8 successively delayed versions of the original message are made available to the audio bus 224.

In cases where the local processor is processing digitized audio signals, those signals which appear on digital bus 218, FIG. 5, are read into the voice RAM 904 via the multibus interface 931 and the internal bus 919. The message is then subsequently read out in delayed increments to the audio channels AUD0, ..., AUD7.

As noted in connection with FIG. 4, the system includes provision for selective monitoring and response via a multiplexed AUD OUT signal provided by the multi-line controllers. See. FIG. 4. That output is applied to the AUDIO IN terminal of the audio controller, FIG. 5, where after multiplexing in MUX 922, it can be selected by the analog multiplexer 901 under control of the MUX control 921.

For indicating the state of the train of staggered messages, the audio controller supplies NAC signals NAC(0), NAC(1), NAC(2) from a next channel indicator 923 to the multi-line controllers via auxiliary bus 224 (see also FIG. 4).

Provisions are also included for interfacing auxiliary units, e.g., tape recorders, to the system via audio line control 928.

In operation, central communications processor 12 stores on floppy disk 116 or hard disk 118 (FIG. 2) telephone numbers for telephone subscribers to be called and voice messages to be delivered. Processor 110 recalls the telephone numbers to be called from storage, transfers them on data bus 112 through serial communications controllers 122a, ..., 122n, multiplexing units 126a, ... 126n, along telephone lines 16a, ..., 16n to the local communications processors 14a, ..., 14n. There the telephone numbers are demultiplexed in multiplexing units, e.g., 216ap or 216as, (FIG. 3) and supplied to processor 210. Processor 210 stores the telephone numbers on floppy disk 214, and, at the appropriate time, supplies a digital signal along digital bus 218, representative of the telephone number to be called, to the appropriate multi-line controller 220a, ..., 220n.

Multi-line controllers 220a, ..., 220n connect the appropriate telephone line to the central office equipment 20a, ... 20n, which connects the line to the dialed local telephone subscriber.

Messages for the telephone subscriber may originate in the central processor 12 from floppy disk 116 or hard disk 118 or from microphone 124 (thence via audio controller 120); they are transmitted over bus 112 and serial controllers 122a, ... 122n, FIG. 2, to multiplexing units 126a, ..., 126n, thence to the demultiplexing unit, e.g. 216ap (FIG. 3) of the local processor and on to audio controller 222 and to the local communications processors, e.g., 210.

Audio controller 222, as noted hereinbefore, supplies a group of successively delayed versions of the audio communication along auxiliary bus 224 to multi-line controllers 220a, ..., 220n. The audio controller also sends commands along auxiliary bus 224 to the multi-line controllers so that the latter supplies to the local telephone subscriber (via the C.O. equipment) the appropriately timed message from central communications processor 12.

Reverse communication is provided from the local telephone subscriber to the central communications processor 12. The incoming signal, e.g., one generated by pressing selected keys on the local subscriber's telephone, is supplied to telephone lines, 24a1, ..., 24an, FIG. 3, via the central office equipment 20a. Multi-line controllers 220a, ..., 220n decode the signals on their respective lines. The incoming data once decoded, is supplied via processor 210 to multiplexing units, e.g., 216ap. The multiplexed information is then supplied to central communications processor 12 over telephone lines 16a, ..., 16n.

The incoming information is demultiplexed in multiplexing units 126a, ..., 126n of the central processor (FIG. 2). Thence the data is supplied through serial communications controllers 122a, ..., 122n along bus 112 to disk controller 114, floppy disk 116, and hard disk 118 under control of processor 110. Processor 110 can manipulate the data stored on floppy disk 116 or hard disk 118 and print out the results on printer 130, or display them on terminal 128.

As an alternate to the above, transmission between the central unit 12 and the local processors may be by way of lines TLa .. TLn which interconnect the audio controller of the central processor 12 with the audio controllers of the local communication processors. In this configuration, the data bus 112 of the central unit is linked via modems 122Ma, FIG. 2A, and modem 216Ma of the local processor, FIG. 3A, to the digital bus 218 of the latter.

By way of illustrating the capacity of the exemplary system, a typical application would employ 14 local communication processors each supporting 400 subscriber lines, for a total of 5600 simultaneous connections. Larger capacities are of course attainable.

As will be evident to those of ordinary skill in the art, the communications network of the present invention permits two-way simultaneous communication between a central unit and a large number of dispersed subscribers. Thus, a communications network can be used to poll telephone subscribers in the community about positions on political issues and provide the results practically instantaneously, or communicate with home utility meters and provide the usage data to the local utility. The communications network can also be used to order merchandise by transmitting orders to and from a local telephone subscriber. In addition, a communications network can be used for two-way communications between television subscribers. In such an instance, television transmissions are transmitted in the usual manner (cable or broadcast). The viewer of the television program can transmit data back to the central communications processor along telephone lines 16a, ..., 16n and 24a, ..., 24n and 25a, ..., 25n. The results of the viewers' responses will be available virtually instantaneously thus permitting the production of TV game shows with mass participation, or TV polling, or TV sales, etc.

While one embodiment of the present invention has been shown in the drawings and described in detail herein, various further modifications may be effected therein by one skilled in the art without departing from the spirit and scope of the invention as defined in the appended claims.

What is claimed is:

1. A mass communication system for establishing two way communication between a central communications processor and a plurality of local subscribers comprising:
    said central communications processor for identifying local subscribers with whom two-way communication is to be established and for transmitting a common message to local subscribers;
    a plurality of local communications processors for establishing communication with said local subscribers identified by the central communications processor;
    wherein said central communications processor and said local communications processors are communicatively linked;
    wherein the common message is transmitted from the central communications processor to the plurality of local subscribers via said local communications processors,
    wherein said plurality of local subscribers are enabled to respond to the message by response to said local communications processors and wherein said local communication processor includes means for transiently storing subscriber responses and for transmitting same to said central communications processor.

2. A telephonic mass communication system for establishing two-way telephone communications with a mass of telephone subscribers, comprising:
    a plurality of local communications processing means, each having means linked to respective telephone switching equipment for establishing two-way telephone communication with a subset of said telephone subscribers and means for relaying subscriber selection and communication data to the respective switching equipment;
    central communications processor means having means for selecting said telephone subscribers and for transmitting different subsets thereof to respective of said local communications processing means;
    link means for providing two-way telephone communication between said central communications processor means and said local communications processing means wherein said local communications processing means includes means for storing digitized audio communications and audio controller means for processing said digitized audio communications to supply audio communications with said local telephone subscribers.

3. A mass communication system for establishing two-way communication between a central communications processor and a plurality of local telephone subscribers comprising:
   said central communications processor for identifying local telephone subscribers with whom two-way communication is to be established and for transmitting a common audio message to local subscribers;
   a plurality of local communications processors for establishing communication with said local telephone subscribers identified by the central communications processor, which communications processors includes:
      a local processor for receiving digital data transmissions from the central communications processor for storage; an audio controller for receiving the message from the central communication processor wherein the audio controller may delay the message in "n" number of steps by equal amounts per step, and wherein the multi-line controller may access the message at any of the "n" delay steps so as to transmit the message from its beginning to each local telephone subscriber; and a multi-line controller for initiating communications with said plurality of local telephone subscribers;
   wherein said central communications processor and said local communications processors are communicatively linked;
   wherein the common audio message is transmitted from the central communications processor to the plurality of local telephone subscribers via the plurality of local communications processors; and
   wherein said plurality of local telephone subscribers are enabled to respond to the message by response to said local communications processors.

4. A mass communication system for establishing two way communication between a central communications processor and a plurality of local subscribers comprising:
   said central communications processor for identifying local subscribers with whom two-way communication is to be established and for transmitting a common message to local subscribers;
   said plurality of local communications processors for establishing communication with said local subscribers identified by the central communications processor;
   wherein said central communications processor and said local communications processors are communicatively linked;
   wherein the common message is transmitted from the central communications processor to the plurality of local subscribers via said local communications processors,
   wherein said plurality of local subscribers are enabled to respond to the message by response to said local communications processors,
   wherein said central communication processor includes means for processing responses received from said local subscribers via said local communications processors,
   wherein said local communication processor includes means for transiently storing subscriber responses and for transmitting same to said central communications processor.

5. A communication system for establishing simultaneous two-way communication with a plurality of local telephone subscribers, comprising:
   a central communications processor;
   at least one local communications processor communicatively linked to said central communications processor;
   a common audio message, said common audio message being provided by said central communication processor to said at least one local communications processor for transmission to said plurality of local telephone subscribers; and
   said at least one local communications processor being simultaneously communicatively linked to each of said plurality of local telephone subscribers, said common audio message being simultaneously transmitted to each of said plurality of local telephone subscribers and responses to the common audio message from said plurality of local telephone subscribers being received by said at least one local communications processor.

6. The communication system according to claim 5, wherein said at least one local communications processor is simultaneously communicatively linked to said plurality of telephone subscribers by local telephone lines.

7. The communication system according to claim 5, wherein said central communications processor is communicatively linked with said at least one local communications processor by a long distance telephone lines.

8. The communication system according to claim 6, wherein said at least one local communications processor is located at a telephone company office.

9. The communication system according to claim 6, wherein said at least one local communications processor is connected to switching equipment at said telephone company office.

10. The communication system according to claim 5, wherein said at least one local communications processor further comprises a plurality of local communications processors.

11. The communication system according to claim 10, wherein said plurality of local communications processors are geographically dispersed.

12. The communication system according to claim 9, wherein said at least one local communications processor includes a converter to convert an identification of said plurality of local telephone subscribers provided by said central communications processor into telephone dial signals for transmission to said switching equipment.

13. The communication system according to claim 5, further comprising multiplexing/demultiplexing units to process communications between said central communications processor and said at least one local communications processor.

14. The communication system according to claim 5, wherein said at least one local communications processor further comprises a memory for transiently storing said responses to said common audio message from said plurality of local telephone subscribers for transmission to said central communications processor.

15. The communication system according to claim 14, wherein said central communications processor further comprises a response processor to process said responses.

16. The communication system according to claim 9, wherein said at least one local communications processor further comprises:
   an audio controller to receive and store said common audio message; and
   a multi-line controller connecting said audio controller to said telephone switching equipment.

17. The communication system according to claim 16, wherein said audio controller may delay the common audio message in "n" number of steps by equal amounts per step, and wherein said multi-line controller may access said common audio message at any of the "n" delay steps so as to transmit the common audio message from its beginning to each of said plurality of local telephone subscribers.

18. A communication system for establishing simultaneous two-way communication with a plurality of local telephone subscribers, comprising:
   a central communications processor;
   at least one local communications processor communicatively linked to said central communications processor;
   means for transmitting a common audio message from said central communication processor to said at least one local communications processor for transmission to said plurality of local telephone subscribers;
   means for simultaneously communicatively linking said at least one local communications processor to each of said plurality of local telephone subscribers;
   means for simultaneously transmitting said common audio message to each of said plurality of local telephone subscribers; and
   means for receiving responses to said common audio message from said plurality of local telephone subscribers.

* * * * *